(12) United States Patent
Wang et al.

(10) Patent No.: US 9,076,056 B2
(45) Date of Patent: Jul. 7, 2015

(54) TEXT DETECTION IN NATURAL IMAGES

(71) Applicant: Adobe Systems Incorporated, San Jose, CA (US)

(72) Inventors: Jue Wang, Kenmore, WA (US); Zhe Lin, Fremont, CA (US); Jianchao Yang, San Jose, CA (US); Weilin Huang, Beijing (CN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 143 days.

(21) Appl. No.: 13/970,993

(22) Filed: Aug. 20, 2013

(65) Prior Publication Data

US 2015/0055857 A1    Feb. 26, 2015

(51) Int. Cl.
G06K 9/18    (2006.01)

(52) U.S. Cl.
CPC ........................................ *G06K 9/18* (2013.01)

(58) Field of Classification Search
CPC ... G06F 3/038; G06F 3/04883; G06F 9/4443; G06F 3/0481; G06K 9/3266; G06K 9/348; G06K 9/18; G06T 11/60; G06T 15/005; G06T 15/205; G06T 2210/61
See application file for complete search history.

(56) References Cited

U.S. PATENT DOCUMENTS

| | | | |
|---|---|---|---|
| 2004/0039496 A1* | 2/2004 | Dautelle | 701/3 |
| 2008/0021502 A1* | 1/2008 | Imielinska et al. | 607/1 |
| 2009/0284550 A1* | 11/2009 | Shimada et al. | 345/619 |
| 2010/0054585 A1* | 3/2010 | Guillou et al. | 382/164 |
| 2010/0156919 A1* | 6/2010 | Bala et al. | 345/582 |
| 2012/0206567 A1* | 8/2012 | Zafarifar et al. | 348/42 |
| 2013/0127823 A1* | 5/2013 | Diverdi et al. | 345/419 |
| 2013/0222385 A1* | 8/2013 | Dorsey et al. | 345/427 |

OTHER PUBLICATIONS

Bosch, A., et al., "Image Classification using Random Forests and Ferns", IEEE 11th International Conference on Computer Vision, 2007, ICCV 2007., (2007), pp. 1-8.
Breiman, L., et al., "Random Forests", Machine Learning, 45(1), (Oct. 2001), pp. 5-32.
Chen, H., et al., "Robust text detection in natural images with edge-enhanced Maximally Stable Extremal Regions", 2011 18th IEEE International Conference on Image Processing (ICIP), (2011), pp. 2609-2612.
Chen, Xiangrong, et al., "Detecting and reading text in natural scenes", Proceedings of the 2004 IEEE Computer Society Conference on Computer Vision and Pattern Recognition, 2004. CVPR 2004, vol. 2, (2004), pp. 11-366-11-373.

(Continued)

Primary Examiner — Jingge Wu
(74) Attorney, Agent, or Firm — Shook, Hardy & Bacon L.L.P.

(57) ABSTRACT

A system and method of text detection in an image are described. A component detection module applies a filter having a stroke width constraint and a stroke color constraint to an image to identify text stroke pixels in the image and to generate both a first map based on the stroke width constraint and a second map based on the stroke color constraint. A component filtering module has a first classifier and second classifier. The first classifier is applied to both the first map and the second map to generate a third map identifying a component of a text in the image. The second classifier is applied to the third map to generate a fourth map identifying a text line of the text in the image. A text region locator module thresholds the fourth map to identify text regions in the image.

19 Claims, 9 Drawing Sheets

(56) References Cited

OTHER PUBLICATIONS

Dalal, N., et al., "Histograms of oriented gradients for human detection", IEEE Computer Society Conference on Computer Vision and Pattern Recognition, 2005. CVPR 2005, vol. 1, (2005), pp. 886-893.
Epshtein, B., et al., "Detecting text in natural scenes with stroke width transform", 2010 IEEE Conference on Computer Vision and Pattern Recognition (CVPR), (2010), pp. 2963-2970.
Gonzalez, A., et al., "Text location in complex images", 2012 21st International Conference on Pattern Recognition (ICPR), (2012), pp. 617-620.
Gonzalez, R., et al., "Chapter 10: Image Segmentation", Digital Image Processing, 2nd Edition, [Online]. Retrieved from the Internet: <URL:http://www.csie.ntpu.edu.tw/~dalton/course/DIP/lecture/Chapter10.pdf>, (2002), 98 pgs.
Hanif, S. M, et al., "Text Detection and Localization in Complex Scene Images using Constrained AdaBoost Algorithm", 10th International Conference on Document Analysis and Recognition, 2009, ICDAR '09., (2009), pp. 1-5.
Kim, K., et al., "Texture-based approach for text detection in images using support vector machines and continuously adaptive mean shift algorithm", IEEE Transactions on Pattern Analysis and Machine Intelligence, 25(12), (2003), pp. 1631-1639.
Lampert, C. H, et al.: "Beyond sliding windows: Object localization by efficient subwindow search", IEEE Conference on Computer Vision and Pattern Recognition, 2008. CVPR 2008., (2008), pp. 1-8.
Lucas, S. M, et al., "ICDAR 2003 robust reading competitions", Seventh International Conference on Document Analysis and Recognition, 2003. Proceedings., (2003), pp. 682-687.
Lucas, S. M, "ICDAR 2005 text locating competition results", Eighth International Conference on Document Analysis and Recognition, 2005. Proceedings., (2005), pp. 80-84.
Neumann, L., et al., "A Method for Text Localization and Recognition in Real-World Images", Image Processing, Computer Vision, Pattern Recognition, and Graphics 2011, Computer Vision—ACCV 2010, (2011), pp. 770-783.
Neumann, L., et al., "Real-time scene text localization and recognition", 2012 IEEE Conference on Computer Vision and Pattern Recognition (CVPR), (2012), pp. 3538-3545.
Neumann, L., et al., "Text Localization in Real-World Images Using Efficiently Pruned Exhaustive Search", 2011 International Conference on Document Analysis and Recognition (ICDAR), (2011), pp. 687-691.
Pan, Yi-Fen, et al., "A Hybrid Approach to Detect and Localize Texts in Natural Scene Images", IEEE Transactions on Image Processing, 20(3), (2011), pp. 800-813.
Shahab, A., et al., "ICDAR 2011 Robust Reading Competition Challenge 2: Reading Text in Scene Images", 2011 International Conference on Document Analysis and Recognition (ICDAR), (2011), pp. 1491-1496.
Shivakumara, P., et al., "A Laplacian approach to multi-oriented text detection in video", IEEE Transactions on Pattern Analysis and Machine Intelligence, 33(2), (2011), pp. 412-419.
Sochman, J., et al,, "WaldBoost—learning for time constrained sequential detection", IEEE Computer Society Conference on Computer Vision and Pattern Recognition, 2005. CVPR 2005, vol. 2, (2005), pp. 150-156.
Tuzel, O., et al., "Human Detection via Classification on Riemannian Manifolds", IEEE Conference on Computer Vision and Pattern Recognition, 2007. CVPR '07., (2007), pp. 1-8.
Tuzel, O., et al., "Region covariance: a fast descriptor for detection and classification", ECCV'06 Proceedings of the 9th European conference on Computer Vision—vol. Part II, (2006), pp. 589-600.
Viola, P., et al., "Robust Real-Time Face Detection", International Journal of Computer Vision, 57(2), (2004), pp. 137-154.
Wang, K., et al,, "End-to-end scene text recognition", 2011 IEEE International Conference on Computer Vision (ICCV), (2011), pp. 1457-1464.
Yao, C., et al., "Detecting texts of arbitrary orientations in natural images", 2012 IEEE Conference on Computer Vision and Pattern Recognition (CVPR), (2012), pp. 1083-1090.
Yi, C, et al., "Text extraction from scene images by character appearance and structure modeling", Computer Vision and Image Understanding, 117(2), (2013), pp. 182-194.
Yi, C., et al., "Text String Detection From Natural Scenes by Structure-Based Partition and Grouping", IEEE Transactions on Image Processing, 20(9), (2011), pp. 2594-2605.
Zhang, Jin, et al., "Character energy and link energy-based text extraction in scene images", ACCV'10 Proceedings of the 10th Asian conference on Computer vision—vol. Part II, (2010), pp. 308-320.

\* cited by examiner

TEXT DETECTION IN NATURAL IMAGES

TECHNICAL FIELD

The present application relates generally to the technical field of text detection in images, and, in various embodiments, to systems and methods discriminating text and non-text regions in images.

BACKGROUND

Text detection and localization in natural scene images serves as a crucial component for content-based information retrieval, as textual information often provides important clues for understanding the high-level semantics of multimedia content. Despite the tremendous effort devoted to solving this problem, text localization remains challenging. The difficulties mainly lie in the diversity of text patterns and the complexity of scenes in natural images. For instance, texts in images often vary dramatically in font, size, and shape, and can be distorted easily by illumination or occlusion. Furthermore, text-like background objects, such as bricks, windows and leaves, often lead to many false alarms in text detection.

Commonly used text detection methods include texture-based methods and component-based methods. In a texture-based method, an image is scanned at different scales using different windows shapes. Text and non-text regions are then classified based on the extracted window descriptors. However, text-lines in images have a much larger layout variation (e.g., rotation, perspective distortion, aspect ratio) that cannot be well captured by generic descriptors.

In contrast to text-based methods, in a component-based method, the majority of background pixels are discarded using low-level filters. Component candidates are then contrasted from the remaining pixels using a set of properties such as consistency of stroke width and color homogeneity. However, low-level filtering is sensitive to image noise and distortions can lead to incorrect component grouping.

BRIEF DESCRIPTION OF THE DRAWINGS

Some embodiments of the present disclosure are illustrated by way of example and not limitation in the figures of the accompanying drawings, in which like reference numbers indicate similar elements and in which.

DETAILED DESCRIPTION

The description that follows includes illustrative systems, methods, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

A system and method of text detection in an image is described. A component detection module applies a low-level filter to an image to identify text stroke pixels in the image. The filter includes a stroke width constraint and a stroke color constraint. The component detection module generates a first map that meets the stroke width constraint and a second map that meets the stroke color constraint. A component filtering module includes a first classifier and second classifier. The first classifier is applied to both the first map and the second map to generate a third map that identifies text components in the image. The second classifier is applied to the third map to generate a fourth map that identifies text lines in the image. A text region locator module thresholds the fourth map to identify text regions in the image.

Figure 1:
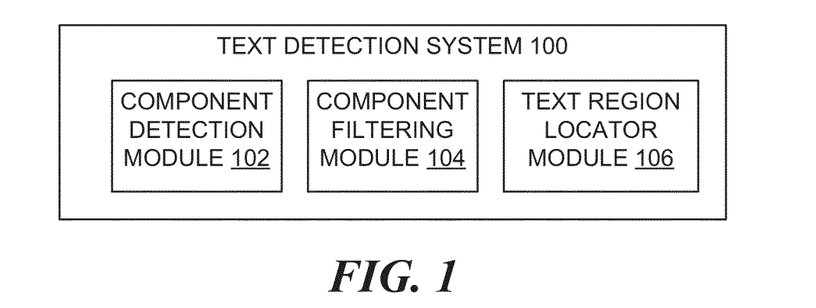
FIG. 1 illustrates an example embodiment of text detection system.

FIG. 1 illustrates an example embodiment of a text detection system 100 used to detect text in images. The text detection system 100 discriminates text and non-text regions in an image at three different levels: pixel level, component level, and text line level using the following modules: a component detection module 102, a component filtering module 104, and a text region locator module 106. The component detection module 102 applies a low-level filter to an image to identify text stroke pixels in the image. Text may be modeled as a combination of stroke components with different orientations. The stroke components may be made up of text stroke pixels. Text can then be determined from the combination of the stroke components.

In one embodiment, the component detection module 102 generates the first map (e.g., stroke width map) based on the stroke width constraint and the second map (e.g., stroke color map) based on the stroke color map.

Figure 8:
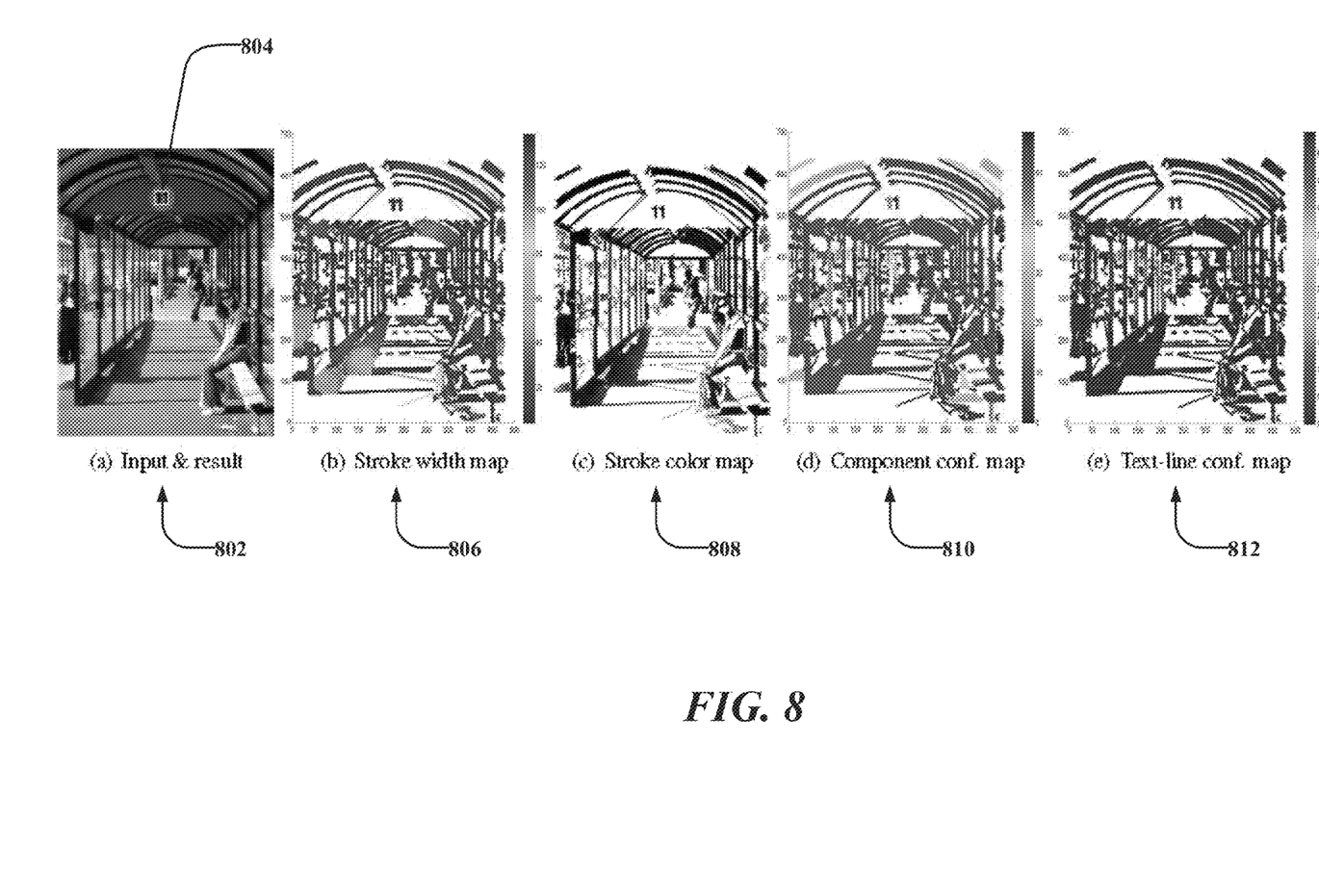
FIG. 8 illustrates an example of a process of an image using the present method for text detection.

The stroke width map is a map generated based on the relative local relationships of edge pixels of the text stroke pixels. Edge pixels are first detected and then validated using the stroke width constraint (e.g., gradient orientation of an edge pixel) to generate the stroke width map. For illustration purposes, FIG. 8 shows an example of a stroke width map as image map 806. Image map 802 illustrates a natural image with identified text as a result of the present text detection process. The detected text 804 is highlighted in a box. Image map 806 illustrates a stroke width map generated with the low-level filter using the stroke width constraint.

A stroke color map is a map generated based on edge pixels stroke color constraint (e.g., pixel color) applied to edge pixels detected from the text stroke pixels. For example, image map 808 of FIG. 8 illustrates an example of a stroke color map.

In one embodiment, the component detection module 102 includes a low-level filter, also referred to as a Stroke Feature Transform (SFT), which extends a prior algorithm called Stroke Width Transform (SWT) with additional color information. By using both color information and edge orientation information, the SFT filter mitigates inter-component connections while enhancing intracomponent connections. In contrast to SWT, the SFT filter further incorporates color cues of text pixels, leading to enhanced performance on inter-component separation and intra-component connection in the image.

The component filtering module 104 uses two classifiers instead of the commonly-used heuristic filtering methods for robust component and text-line classification. Using the heuristic properties and statistical characteristics of textual regions, the component filtering module 104 includes a first classifier (e.g., component classifier) at a component-level and a second classifier (e.g., text-line classifier) at a text-line-level to capture the inherent correlations between multiple features and to encode spatial information of text strokes in the image.

The component classifier is applied to both the stroke width map and the stroke color map to generate a component confidence map. The text-line classifier is applied to the component confidence map to generate a text-line confidence map.

In one embodiment, the text component classifier and the text-line classifier of the component filtering module 104 are applied sequentially to the output of the SFT filter to extract text regions and to eliminate the heuristic procedures that are commonly used in previous approaches. The two classifiers may be built upon two Text Covariance Descriptors (TCDs) that encode both the heuristic properties and the statistical characteristics of text strokes.

The text region locator module 106 thresholds the text-line confidence map to identify and locate text regions in the image.

Figure 2:
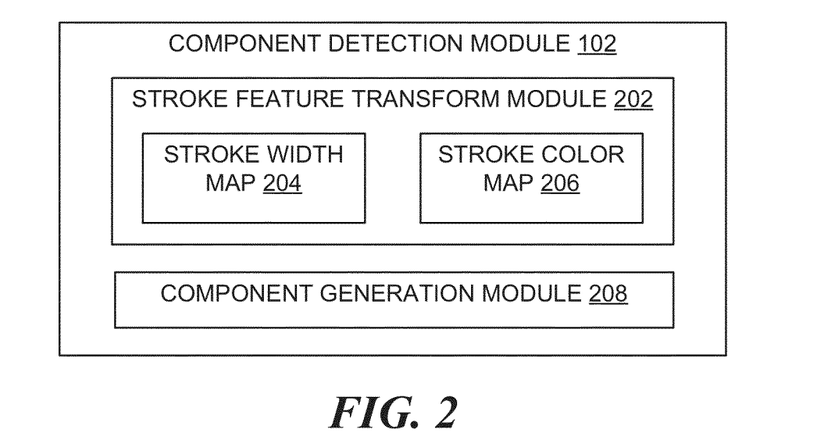
FIG. 2 illustrates an example embodiment of a component detection module.

FIG. 2 illustrates an example embodiment of the component detection module 102. The component detection module 102 includes a stroke feature transform module 202 and a component generation module 208. Component detection involves two pixel-level operation steps. First, a low-level stroke filtering method called Stroke Feature Transform (SFT) is used to identify text stroke pixels. Second, the two maps (e.g., a stroke width map 204 and a stroke color map 206) generated from the component detection module 102 (e.g., SFT filter) are used to perform text pixel grouping (also referred to as component generation).

Figure 9:
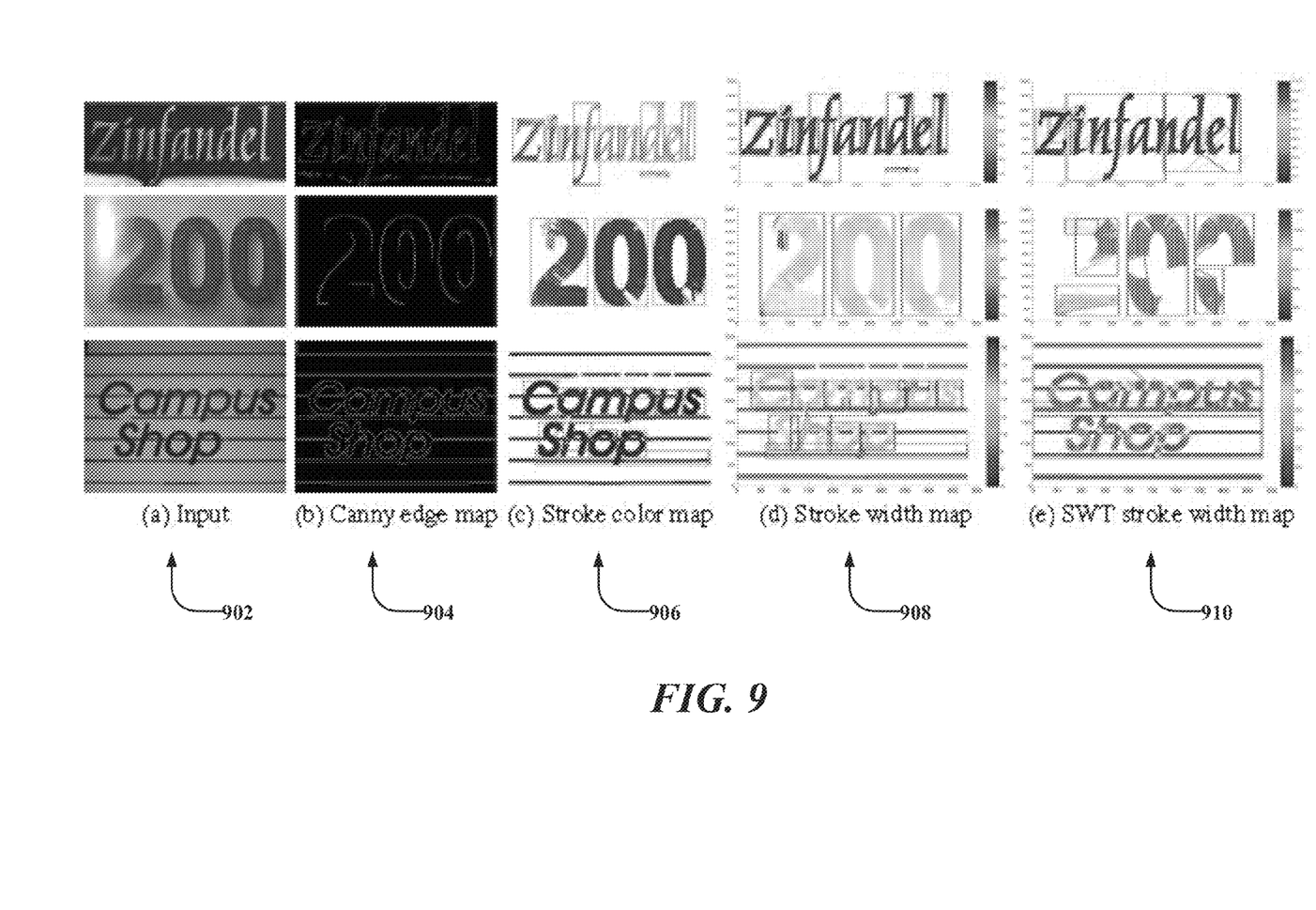
FIG. 9 illustrates another example of an image processed using a stroke color map and a stroke width map filter.

A prior technique called Stroke Width Transform (SWT) locates text in an image using the following method: stroke pixels in an image are first detected by shooting a pixel ray from an edge pixel ($p_x$) to its opposite edge pixel ($p_y$) along the gradient direction $d_x$. The ray may be considered valid if the gradient orientations of the pair of edge pixels are roughly opposite to each other. Otherwise, the ray may be considered invalid. All pixels covered by a valid ray may be labeled by the same stroke width, which is the distance between the pair of edge pixels. In this manner, SWT filters out the background pixels and assigns text pixels with stroke widths. However, only gradient orientation and edge information are used for ray tracking while each ray is handled independently. There may be a large number of edge pixels that have irregular gradient orientations that are not perpendicular to the correct stroke edge directions. As such, these irregular orientations may cause two problems: (1) multiple letters can be accidentally merged into one component if the irregular orientations point to the outside of the strokes; and (2) a single character can be split into multiple components due to misrejection of ray candidates. FIG. 9 illustrates an example of SWT stroke width map as image map 910 having inaccurate text grouping using the SWT filter approach.

To remedy the problems of SWT filters, the presently described low-level filter SFT extends the algorithm of the SWT filter by leveraging two additional cues during ray tracking: color uniformity and local relationships of edge pixels to generate two maps, the stroke width map 204 and the stroke color map 206 jointly.

The following illustrates one embodiment of an operation of the SFT algorithm:

First, a canny edge detector may be applied to detect edge pixels from an input image to generate a canny edge map. Second, for each edge pixel $p_x$ on the canny edge map, a ray is shot along its gradient direction $d_x$ and pixels are checked to determine whether they are encountered along the way. This ray is ended at the current pixel $p_{cur}$ and set as a valid ray if $p_{cur}$ satisfies either of the following two constraints:

1. Stroke width constraint: $p_{cur}$ is an edge pixel and its gradient orientation $d_{cur}$ is opposite to $d_x$ as:

$$\|d_{cur}-d_x\|-pi<pi/2$$

2. Stroke color constraint: the distance between the current pixel's color $p_{cur}$ (referred to as $C_{cur}$) and the median ray color $C_r$ (computed as median R, G, B of pixels on the ray) satisfies $\|C_{cur}-C_r\|>$lambda c where lambda c is computed by a linearly decreasing function from 200 to 100 with respect to the number of pixels in the current ray. If this color discontinuity is detected, the current pixel is reconsidered as an edge pixel and its orientation is checked as in the Step 1 using a stricter threshold, $\|d_{cur}-d_x\|-pi<pi/6$.

If neither of the two previous constraints are met for a certain number of checked pixels on the ray, the current ray is discarded, and the algorithm continues to the next edge pixel and repeats the above process. Once all the edge pixels are considered on the canny edge map, invalid rays whose median colors are significantly different from its local neighbors on the canny edge map are filtered out. This may be also referred to as the neighborhood coherency constraint.

Finally, a stroke width value and the median RGB color value are assigned to all pixels in a valid ray to construct the stroke width map and the stroke color map.

As such, SFT reduces the number of incorrect connections substantially compared to the original SWT approach. Because of the stroke color constraint, SFT filter can better discard rays shooting towards the outside of the strokes than SWT filter, because color often changes dramatically in the background region. Furthermore, missing rays caused by missing edge information may be recovered to prevent inter-component separations. The neighborhood coherency constraint may be used to discard occasional errors in text strokes, as well as a large amount of incorrect, scattered connections in the background.

Another benefit of SFT is that it produces a stroke color map as a byproduct of the transform operation, in which the stroke pixels have better uniformity and stronger distinction from background pixels than the stroke width map.

Hence, by applying the stroke width map 204 and the stroke color map 206 jointly for grouping, the SFT filter can effectively identify incorrectly-connected stroke components and other outliers in the background.

Next, the component generation module 208 applies region growing for grouping the stroke pixels into different components by using both the stroke width map 204 and the stroke color map 206. The values in the stroke width map 204 are normalized, for example, from 0 to 255. Then, region growing is performed in a 4-dimensional space by representing each stroke pixel using a width value and R, G, B color values.

Neighboring pixels whose Euclidean distances in the defined 4-D space are below a threshold (empirically set as 75) are connected. To this end, both stroke width and color information are incorporated for low-level filtering and grouping.

Figure 3:
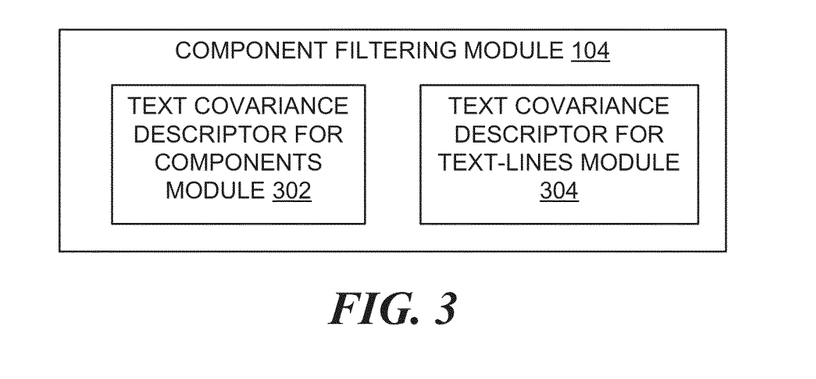
FIG. 3 illustrates an example embodiment of a component filtering module.

FIG. 3 illustrates an example embodiment of the component filtering module 104. Previous approaches use heuristic rules for filtering out false components, and grouping true text components into text-lines. However, those previous approaches merely compute local features from all pixels within a sub-window. In contrast, the present approach includes two Text Covariance Descriptors (TCDs) that derive features from the stroke pixels detected by the component generation module 208. Using two TCDs enables a higher discriminative representation of text information and provides for better generalization capability. In one embodiment, the component filtering module 104 includes a text covariance descriptor for components module 302 and a text covariance descriptor for text-lines module 304.

The text covariance descriptor for components (TCD-C) module 302 may use a covariance matrix on a basic feature vector. One example method for component filtering is to perform heuristic filtering with multiple features. Histogram statistics of various low-level image properties may also be used for classification-based filters. These methods compute the statistics of each single feature separately.

In order to explore statistical feature correlations, the covariance matrix may be used on a basic feature vector. The diagonal entries of the covariance matrix may be the variances of each feature, while the nondiagonal entries capture the correlation between features. The features may also provide information for discriminating text strokes from background clutter in the image. Furthermore, by jointly computing coordinates of stroke pixels with other features, the TCD-C module 302 may encode local spatial information into the descriptor.

The basic elements in each text component are the stroke pixels. Although the number of stroke pixels may vary between different components, the covariance descriptor remains invariant to the number of elements within the regions. In particular, the size of the descriptor may be determined by the number of adopted features, which is often small. Based on heuristic and geometric characteristics of text strokes, nine different basic features for computing the TCD-C module 302 may be adopted. Examples of some of the features used to compute the TCD-C are listed and described further below:

1. Normalized pixel coordinates $I'_x, I'_y$ in X and Y axis for enhanced spatial locality. The original coordinates are: $I'_x=(I_x-I_x min)/(I_x max-I_x min)$ and $I'_y=(I_y-I_y min)/(I_y max-I_y min)$, where $I_x min, I_x max, I_y min, I_y max$ are the minimum and maximum coordinates of the regions in X- and Y-axis. Coordinate normalization enables the TCD-C to be invariant to geometric transforms and scale changes.

2. Pixel intensities $I'$ and RGB values $I'_R, I'_G$, and $I'_B$ in the stroke color map for color uniformity. All values may be linearly normalized to, for example, [0, 1].

3. Stroke width values in the stroke width map $S_{sum}$ for stroke width consistency. The values may be normalized by the maximum stroke width in the region.

4. Stroke distance values in a stroke distance map $S_{dist}$, normalized, for example, to [0, 1], which compensate the stroke width map for stroke width consistency. The stroke distance map may be computed from the stroke width map 204 of FIG. 2, using the Euclidean distance transform.

5. Per-pixel edge labeling for describing the stroke layout. The labels may include: 1 for edge pixels and 0 for non-edge ones.

By combining the above features, the resulting covariance descriptor may result in a 9×9 matrix. As such, the upper triangular elements of the matrix may be concatenated to construct a 45-dimensional vector as a component descriptor.

In another embodiment, three additional global features may be added into the text covariance descriptor : (1) the aspect ratio (e.g., ratio between the height and width of the component); (2) the occupation percentage (e.g., computed as the ratio of total number of pixels to the number of stoke pixels in the component); and (3) the ratio of the component scale (e.g., the larger value of the width and height of the component region) to its mean stroke width map value. These three features may be added to form the final TCD-C that result in a 48-dimensional vector as a component descriptor. A random forests classifier may be trained and used to generate a confident score for each text component.

Once the detected components are determined, the process of text-line aggregation continues. First, two components having similar characteristics may be paired together by using a set of heuristic conditions (e.g., similar mean stroke width, color, height and distance between them). Second, pairs of components may be merged together if they share the same components and have similar directions. The text-lines may be detected when no pair or chain can be merged. Third text-lines may be broken into words by computing and thresholding the horizontal distances between consecutive components.

The text covariance descriptor for text-lines module 304 identifies text-like outliers. A region may be defined in word or text-line level for the TCD-T filter, and elements may be defined as the valid components within each region. Similar to TCD-C, heuristic properties, geometric characteristics and spatial distributions of the components may be used to generate representations of text-lines. In addition, since each component is composed by a set of pixels, the components can also provide meaningful statistical characteristics for the text-line descriptor.

In TCD-T, two covariance matrices may be used to compute two different types of the component features independently. The first matrix computes the correlated features between heuristic and geometric properties, as described below:

1. Seven heuristic features used in TCD-C, including mean values of intensities, colors, stroke widths and distances (mean[$I'$, $I'R$, $I'G$ , $I'B$, $S_{sum}$, $S_{dist}$]). $S_{swm}$ and $S_{dist}$ are normalized using their maximum values in the text-line. The occupation percentage of the stroke pixels in each component may also be used.

2. The coordinates ($C_x$, $C_y$) of component centers. In one example, the coordinates of component centers may be normalized with respect to the text-line's bounding box. Components within the same text-line may also have similar or uniformly increasing $C_y$ values for horizontal or slanted text-lines.

3. The heights of components may be normalized by the height of the text-line.

4. Cosine value of the angle between the current and the next components. The angle may be measured by the orientation from the center of the current component to that of the next one. The value of the last component may be set to the same as the one before it. The value of the component may be set to zero if only a single component is included in a text-line.

5. Horizontal distance from the current component to the next one, measured by the normalized horizontal coordinates ($C_x$) of two component centers. The distance of the last component may be equal to the one before it, and is set to zero for single-component text-lines.

In total, there may be 12 component features adopted for the first covariance matrix, which in turn generates a 78-dimensional vector for text-line representation.

The second covariance matrix may be computed to capture the correlation of statistical features among components. For each component, a 16-bit Histogram of Oriented Gradients (HOG) may be computed from its edge pixels, which carries the underlying shape information of its strokes. Therefore, a 16×16 covariance matrix may be generated, resulting a 136-dimensional feature vector.

Next, the feature vectors extracted from the two covariance matrices are concatenated, along with two additional features: (1) the number of components in the text-line, normalized by dividing the maximum number of components in a textline, e.g., 10; and (2) the mean confidence value of the components generated by the previous component-level classifier. The final TCD-T feature vector thus may include 216 dimensions. According to the present disclosure, TCD-T may also allow a single component to be treated as a word or as a text-line (this happens when using the text separation method in text-line aggregation). In this case, two covariance vectors may both be 0 and the TCD-T vector may only have non-zero entries in the last two dimensions.

Given the constructed TCD-T vectors, a discriminative text-line classifier may be trained using the random forests classifier. The text-line classifier may generate a confidence value for each text-line candidate, and the final text-line detection result may be produced by thresholding this confidence map with text region locator module 106.

Figure 4:
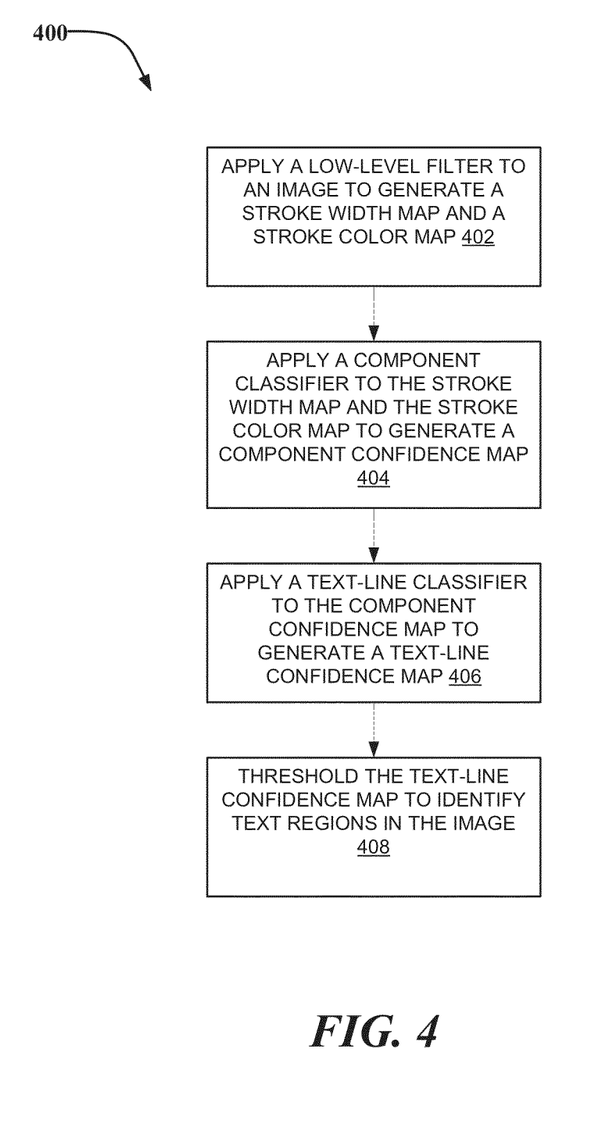
FIG. 4 is a flowchart illustrating an example embodiment of a method for text detection in natural images.

FIG. 4 is a flowchart illustrating an example embodiment of a method 400 for text detection in natural images. At operation 402, a low-level filter is applied to an image to generate both a stroke width map and a stroke color map. At operation 404, a component classifier is applied to the stroke width map and the stroke color map to generate a component confidence map. At operation 406, a text-line classifier is applied to the component confidence map to generate a text-line confidence map. At operation 408, the text-line confidence map is thresholded to identify text regions in the image.

Figure 5:
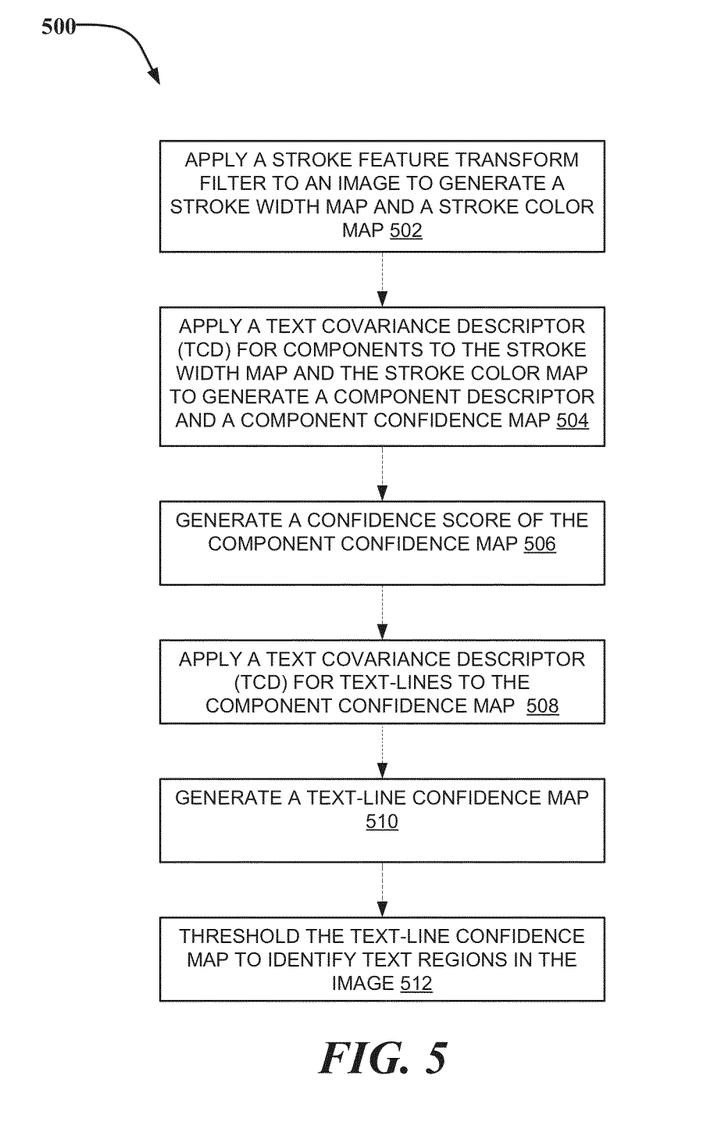
FIG. 5 is a flowchart illustrating an example embodiment of a method for text detection in natural images.

FIG. 5 is a flowchart illustrating an example embodiment of a method 500 for text detection in natural images. At operation 502, a stroke feature transform (SFT) filter is applied to an image to generate a stroke width map and a stroke color map. At operation 504, a text covariance descriptor for components (TCD-C) is applied to the stroke width map and the stroke color map to generate a component descriptor and a component confidence map. At operation 506, a confidence score of the component confidence map is generated. At operation 508, a text covariance descriptor for text-lines (TCD-T) is applied to the component confidence map. At operation 510, the text-line confidence map is generated from TCD-T. At operation 512, the text-line confidence map is thresholded to identify text regions in the image.

Figure 7:
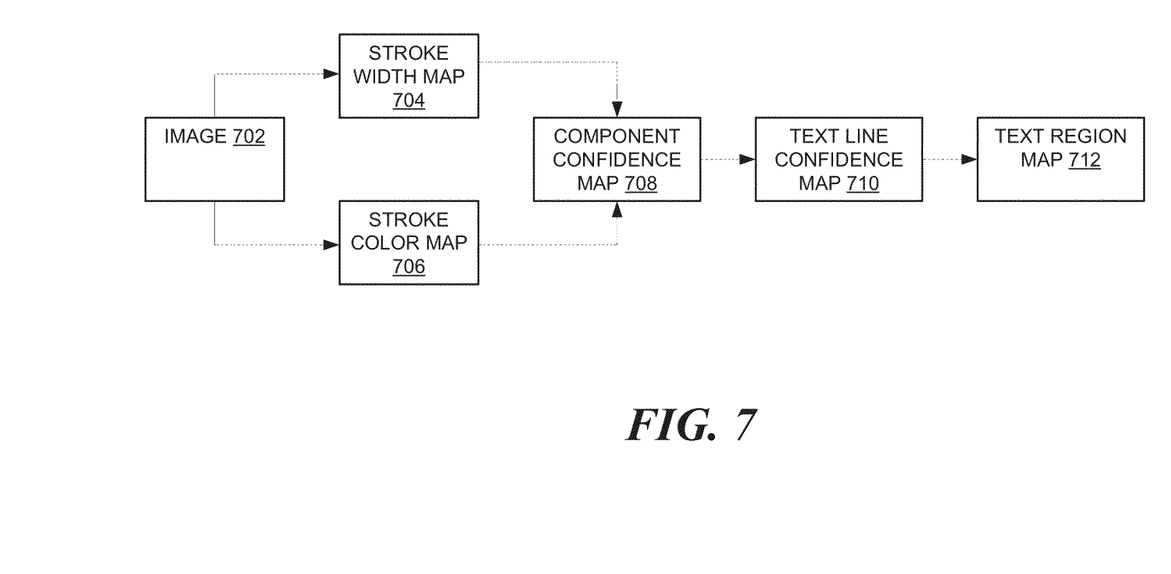
FIG. 7 illustrates an example embodiment of a flow process of the text detection system.

FIG. 7 illustrates an example embodiment of a flow process of the text detection system. A natural image 702 is provided. For example, the natural image 702 may include a digital picture taken with a digital camera. A low-level filter, such as the SFT module 202 of FIG. 2 as previously described, may be applied to the image 702 to generate both a stroke width map 704 and a stroke color map 706.

A component classifier, such as the text covariance descriptor for components module 302 of FIG. 3, may be applied to both the stroke width map 704 and the stroke color map 706 to generate a component confidence map 708 that identifies areas of relative levels of confidence of text components in the image 702.

A text-line classifier, such the text covariance descriptor for text-lines module 304 of FIG. 3, may be applied to the component confidence map 708 to generate a text-line confidence map 710 that identifies areas of relative levels of confidence of text-lines in the image 702.

A text region map 712 may finally be generated based on the text-line confidence map 710 by thresholding the text-line confidence map 710.

FIG. 8 illustrates an example of a process of an image using the present method for text detection. Image map 802 illustrates a natural image with the detected text 804. Image map 806 represents a stroke width map. Image map 808 represents a stroke color map. Image map 810 represents a component confidence map generated from image maps 806 and 808. Image map 812 represents a text-line confidence map generated from the image map 810. The scale on the side of each image map 806-812 represents the relative level of confidence of a text component or text line.

FIG. 9 illustrates another example of an image processed using a stroke color map and a stroke width map filter. Image map 902 represents examples of input images. Image map 904 illustrates canny edge maps as a result of applying a canny edge filter. Image map 906 illustrates identified text regions using a stroke color constraint. Image map 908 illustrates identified text regions using a stroke width constraint. The examples in FIG. 9 show that the present SFT-based method generates fewer inter-component (top example) and more intra-component connections (middle example), and is more robust against background structures (bottom example) than the original SWT method (image map 910). SFT recovers more rays even in places where canny edge detection fails (see the two "0"s in the middle example of image maps 904, 906, 908). As such, SFT-based method leads to a more accurate component grouping than SWT-based method when comparing image maps 906, 908 with image map 910.

Figure 10:
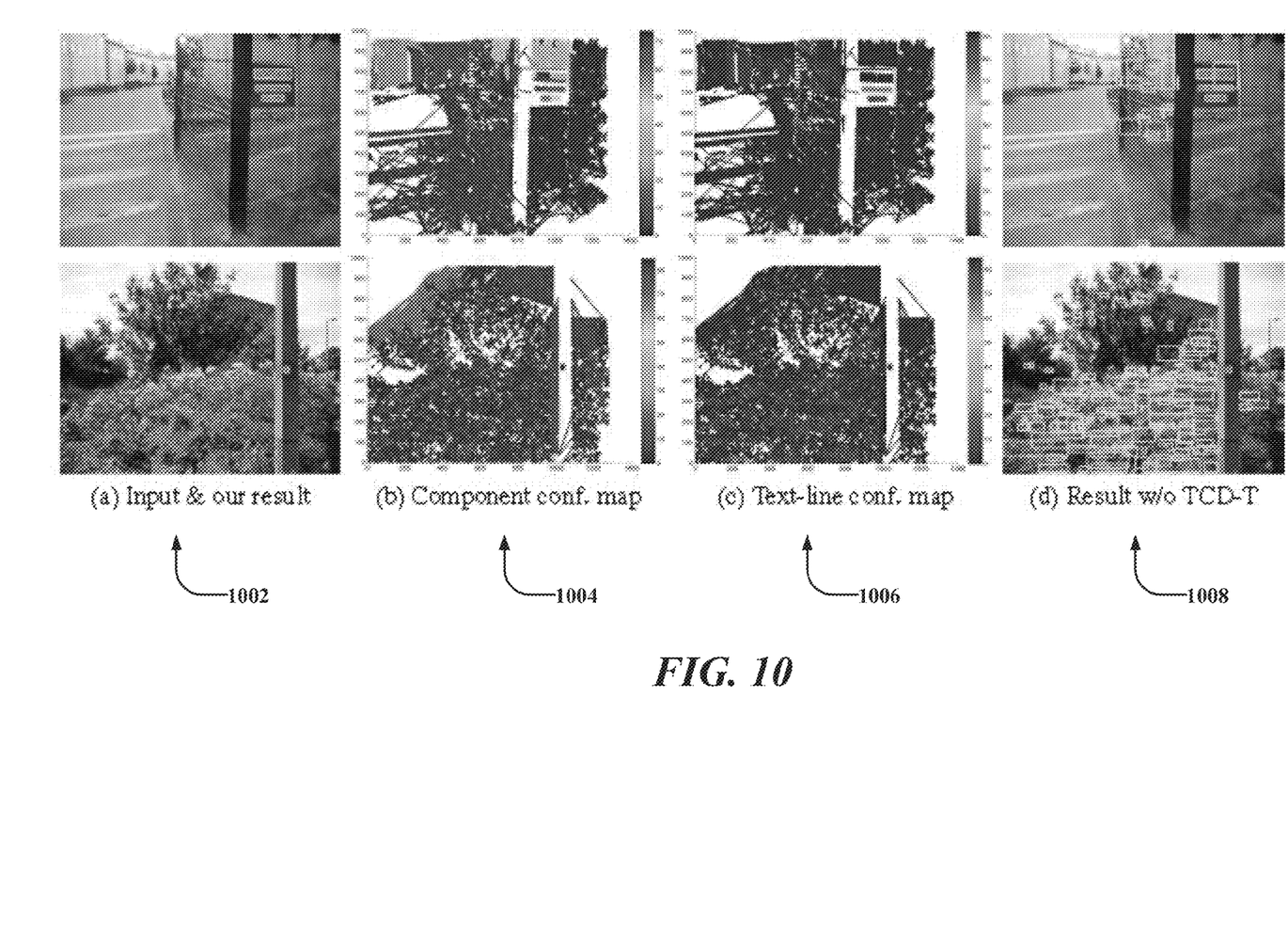
FIG. 10 illustrates another example of an image processed using a component and a text-line map filter.

FIG. 10 illustrates another example of an image processed using a component and a text-line map filter. Given the input image 1002, TCD-C generates a component confidence map 1004, which is fed into TCD-T to generate a text-line confidence map 1006. The text-line detection result is overlaid on the input image 1002, where green bounding boxes are actual text and yellow boxes identify the results of the present process. If TCD-T were to be discarded in the pipeline, the result is shown in image map 1008 that contains many outliers.

Figure 11:
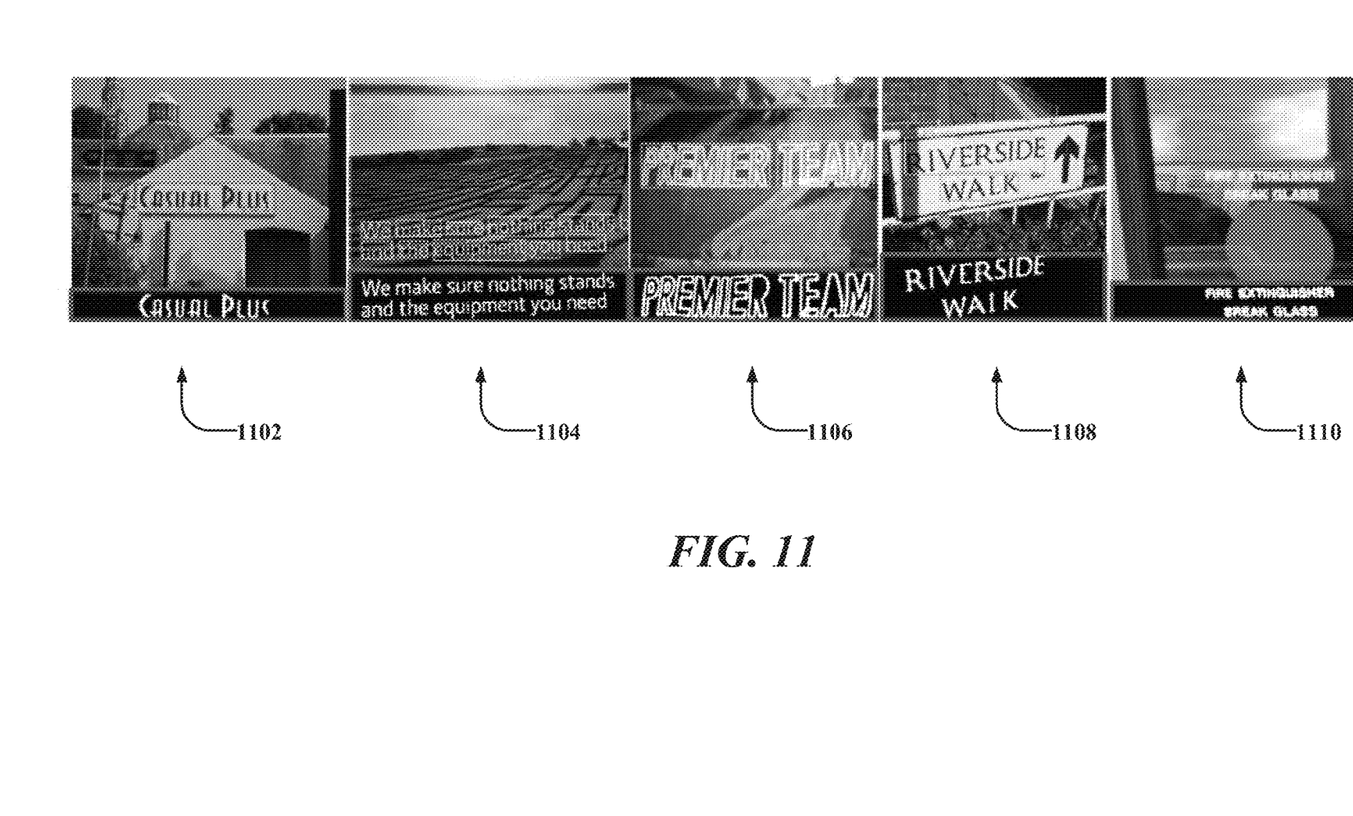
FIG. 11 illustrates an example of images processed with the present method for text detection.

FIG. 11 illustrates an example of images 1102, 1104, 1106, 1108, and 1110 processed with the present method for text detection. FIG. 11 suggests that the present text detection system is robust against large variations in text font, color, size, and geometric distortion. In addition to the detected text lines, the present text detection system also generates text pixel segmentation results shown at the bottom of each example, where white pixels include all pixels in the remaining valid text components. The segmentation can be potentially used in other applications such as text content or font recognition.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. For example, software may accordingly configure a processor to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry or in computer hardware, firmware, software, or in combinations of them. Example embodiments may be implemented using a computer program product, (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and a server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below, are set out hardware (e.g., machine) and software architectures that may be deployed in various example embodiments.

Example Machine Architecture and Machine-Readable Medium

Figure 6:
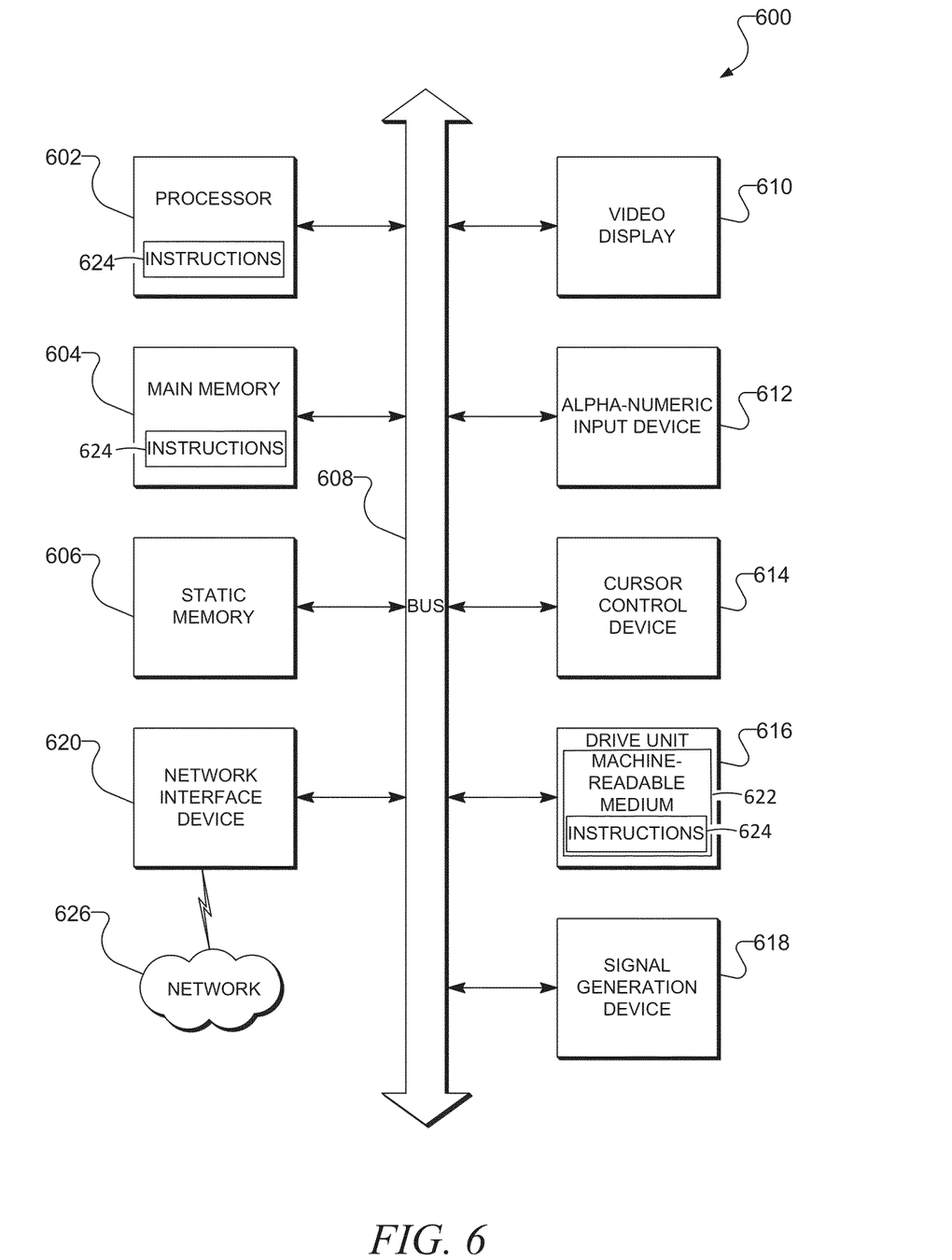
FIG. 6 shows a diagrammatic representation of a machine in the example form of a computer system within which a set of instructions may be executed to cause the machine to perform any one or more of the methodologies discussed herein.

FIG. 6 is a block diagram of a machine in the example form of a computer system 600 within which instructions (e.g., 624) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (e.g., 624-sequential or otherwise) that specify actions to be taken by that machine. Further, while only a single machine is illustrated, the term "machine" shall also be taken to include any collection of machines that individually or jointly execute a set (or multiple sets) of instructions (e.g., 624) to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions (e.g., 624) for execution by the machine and that cause the machine to perform any one or more of the methodologies of the present embodiments, or that is capable of storing, encoding or carrying data structures utilized by or associated with such instructions (e.g., 624). The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; compact disc-read-only memory (CD-ROM) and digital versatile disc (or digital video disc) read-only memory (DVD-ROM) disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks 626 include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions (e.g., 624) for execution by the machine, and includes digital or analog communication signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. Therefore, this Detailed Description is not to be taken in a limiting sense, and the scope of various embodiments is defined only by the appended claims along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Although specific embodiments have been illustrated and described herein, it should be appreciated that any arrangement calculated to achieve the same purpose may be substituted for the specific embodiments shown. This disclosure is intended to cover any and all adaptations or variations of several embodiments. Combinations of the above embodiments and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, the inventive subject matter lies in less than all features of a single disclosed embodiment. Thus, the following claims are hereby incorporated into the Detailed Description with each claim standing on its own as a separate embodiment.

What is claimed is:

1. A method comprising:
    applying a filter having a stroke width constraint and a stroke color constraint to an image to generate a first map based on the stroke width constraint and a second map based on the stroke color constraint;
    applying a first classifier to both the first map and the second map to generate a third map identifying a component of a text in the image;

applying a second classifier to the third map to generate a fourth map identifying a text line of the text in the image, wherein the second classifier comprises a Text Covariance Descriptor (TCD) algorithm for text lines, the TCD algorithm configured to:
compute a first covariance matrix for correlated features of components between heuristic and geometric properties of the first map and the second map,
compute a second covariance matrix for correlation of statistical features among the components,
generate a feature vector based on the first and second covariance matrices, a normalized number of components in a text-line, and a mean confidence score of the third map, and
generate a confidence score of the fourth map for each text-line candidate from the feature vector; and
thresholding the fourth map to identify text regions in the image.

2. The method of claim 1, further comprising:
identifying text stroke pixels in the image with the filter.

3. The method of claim 1, wherein the first map comprises a stroke width map identifying text stroke pixels in the image satisfying a requirement of the stroke width constraint of the filter.

4. The method of claim 1, wherein the second map comprises a stroke color map identifying text stroke pixels in the image satisfying a requirement of the stroke color constraint of the filter.

5. The method of claim 1, wherein the filter comprises a stroke feature transform (SFT) filter algorithm configured to:
identify a pixel ray from an edge pixel to its opposite edge pixel along a gradient direction;
determine pixels encountered along the pixel ray; and
validate each pixel along the pixel ray based on the stroke width constraint and the stroke color constraint to determine whether to discard the pixel ray.

6. The method of claim 5, wherein the SFT filter algorithm is further configured to:
filter out invalid pixel rays whose median colors are significantly different from local neighbors on a canny edge map;
assign a stroke width value for the stroke width constraint to all pixels in a valid pixel ray to construct the stroke width map; and
assign a median RGB color value for the stroke color constraint to all pixels in the valid pixel ray to the stroke color map.

7. The method of claim 6, wherein the SFT filter algorithm is further configured to:
group stroke pixels into different components using both the first and the second map;
normalize values in the first map;
perform region growing in a four-dimensional space by representing each stroke pixel using a width value and RGB color values; and
connect neighboring pixels with distances in the four-dimensional space below a threshold distance value.

8. The method of claim 1, wherein the first classifier comprises a Text Covariance Descriptor (TCD) algorithm for components, the TCD algorithm configured to perform heuristic filtering with a plurality of features to generate a component descriptor.

9. The method of claim 8, wherein the plurality of features comprises normalized pixel coordinates, pixel intensities and RGB values in the second map, stroke width values in the first map, stroke distance values in a stroke distance map computed from the first map, and per-pixel edge labeling.

10. The method of claim 8, wherein the component descriptor further comprises an aspect ratio, a ratio of a total number of pixels to a total number of stroke pixels in a component, and a ratio of a component scale to the mean stroke width map value.

11. The method of claim 10, wherein the TCD algorithm is further configured to:
generate a confidence score of the third map for each text component using a random forest classifier.

12. The method of claim 1, wherein the features of the components for the second covariance matrix comprise mean values of pixel intensities, pixel colors, stroke widths and pixel distances, normalized stroke width values in the first map, normalized stroke distance values in a stroke distance map computed from the first map, normalized coordinates of component centers, normalized heights of components, cosine value of the angle between two components, and horizontal distances between two components.

13. A text detection system comprising:
a component detection module configured to apply a filter having a stroke width constraint and a stroke color constraint to an image to generate a first map based on the stroke width constraint and a second map based on the stroke color constraint;
a component filtering module comprising a first classifier and a second classifier, the first classifier applied to both the first map and the second map to generate a third map identifying a component of a text in the image, the second classifier applied to the third map to generate a fourth map identifying a text line of the text in the image, wherein the second classifier comprises a Text Covariance Descriptor (TCD) algorithm for text lines, the TCD algorithm configured to:
compute a first covariance matrix for correlated features of components between heuristic and geometric properties of the first map and the second map,
compute a second covariance matrix for correlation of statistical features among the components,
generate a feature vector based on the first and second covariance matrices, a normalized number of components in a text-line, and a mean confidence score of the third map, and
generate a confidence score of the fourth map for each text-line candidate from the feature vector; and
a text region locator module configured to threshold the fourth map to identify text regions in the image.

14. The text detection system of claim 13, wherein the component detection module is configured to identify text stroke pixels in the image with the filter.

15. The text detection system of claim 13, wherein the first map comprises a stroke width map identifying text stroke pixels in the image satisfying a requirement of the stroke width constraint of the filter, wherein the second map comprises a stroke color map identifying text strokes pixels in the image satisfying a requirement of the stroke color constraint of the filter.

16. The text detection system of claim 13, wherein the filter comprises a stroke feature transform (SFT) filter algorithm configured to:
identify a pixel ray from an edge pixel to its opposite edge pixel along a gradient direction;
determine pixels encountered along the pixel ray; and
validate each pixel along the pixel ray based on the stroke width constraint and the stroke color constraint to determine whether to discard the pixel ray.

17. The text detection system of claim 16, wherein the SFT filter algorithm is further configured to:

filter out invalid pixel rays whose median colors are significantly different from local neighbors on a canny edge map;

assign a stroke width value for the stroke width constraint to all pixels in a valid pixel ray to construct the stroke width map; and assign a median RGB color value for the stroke color constraint to all pixels in the valid pixel ray to the stroke color map.

18. The text detection system of claim 17, wherein the SFT filter algorithm is further configured to:

group stroke pixels into different components using both the first map and the second map;

normalize values in the first map;

perform region growing in a four-dimensional space by representing each stroke pixel using a width value and RGB color values; and connect neighboring pixels with distances in the four-dimensional space below a threshold distance value.

19. A non-transitory machine-readable storage medium storing instructions which, when executed by at least one processor, perform operations comprising:

applying a filter having a stroke width constraint and a stroke color constraint to an image to generate a first map based on the stroke width constraint and a second map based on the stroke color constraint;

applying a first classifier to both the first map and the second map to generate a third map identifying a component of a text in the image;

applying a second classifier to the third map to generate a fourth map identifying a text line of the text in the image, wherein the second classifier comprises a Text Covariance Descriptor (TCD) algorithm for text lines, the TCD algorithm configured to:

compute a first covariance matrix for correlated features of components between heuristic and geometric properties of the first map and the second map, compute a second covariance matrix for correlation of statistical features among the components, generate a feature vector based on the first and second covariance matrices, a normalized number of components in a text-line, and a mean confidence score of the third map, and generate a confidence score of the fourth map for each text-line candidate from the feature vector; and thresholding the fourth map to identify text regions in the image.

* * * * *